US011006585B2

United States Patent
Croteau

(10) Patent No.: US 11,006,585 B2
(45) Date of Patent: May 18, 2021

(54) AUTOMATED TERRARIUM

(71) Applicant: Jesse Jordan Croteau, Stateline, NV (US)

(72) Inventor: Jesse Jordan Croteau, Stateline, NV (US)

(73) Assignee: Grow Op, LLC, Stateline, NV (US)

( * ) Notice: Subject to any disclaimer, the term of this patent is extended or adjusted under 35 U.S.C. 154(b) by 501 days.

(21) Appl. No.: 15/938,112

(22) Filed: Mar. 28, 2018

(65) Prior Publication Data

US 2018/0288948 A1  Oct. 11, 2018

Related U.S. Application Data

(60) Provisional application No. 62/482,057, filed on Apr. 5, 2017.

(51) Int. Cl.
*A01G 9/24* (2006.01)
*A01G 9/20* (2006.01)
(Continued)

(52) U.S. Cl.
CPC .............. *A01G 9/24* (2013.01); *A01G 9/02* (2013.01); *A01G 9/16* (2013.01); *A01G 9/20* (2013.01);
(Continued)

(58) Field of Classification Search
CPC ... A01G 9/24; A01G 9/02; A01G 9/16; A01G 9/20; A01G 9/22; A01G 9/247; A01G 27/003; A01G 9/12; A01G 9/246; A01G 9/249; A01G 9/26; A01G 9/14; A01G 27/02; A01G 27/00; A01G 9/124; A01G 17/06; A01G 9/1438; A01G 9/1469; A01G 13/02; A01G 13/0206; A01G 13/0212;
(Continued)

(56) References Cited

U.S. PATENT DOCUMENTS

| 1,591,845 A | 7/1926 | Leah et al. |
| 2,079,177 A | 5/1937 | Membrino et al. |

(Continued)

FOREIGN PATENT DOCUMENTS

| CN | 201342117 | 11/2009 |
| CN | 202958271 | 6/2012 |

(Continued)

OTHER PUBLICATIONS

Machine translation of WO 2013/108332 to Fujiyama, published Jul. 25, 2013 (cited on Mar. 29, 2018 IDS).*

(Continued)

*Primary Examiner* — Kathleen I Alker
(74) *Attorney, Agent, or Firm* — Remenick PLLC

(57) ABSTRACT

Automated terrariums and methods of using the terrariums are disclosed. The automated terrarium comprises a housing having a base and a lid, wherein the lid is supported by at least two support pillars. The terrarium also comprises at least two transparent side panels supported by the at least two support pillars and positioned between the base and the lid, an irrigation system within the base, a lighting system within the lid, and a control unit. The control unit is adapted to monitor growth of the plant and adjust the irrigation system, heating system, airflow system, and/or lighting system.

20 Claims, 9 Drawing Sheets

(51) Int. Cl.
   *A01G 9/02*   (2018.01)
   *A01G 27/00*  (2006.01)
   *A01G 9/22*   (2006.01)
   *A01G 9/16*   (2006.01)
   *A01G 9/12*       (2006.01)
(52) U.S. Cl.
   CPC ............ *A01G 9/22* (2013.01); *A01G 9/247* (2013.01); *A01G 27/003* (2013.01); *A01G 9/12* (2013.01)
(58) Field of Classification Search
   CPC ............ A01G 13/0231; A01G 13/0243; A01G 13/04; A01G 13/043; A01K 63/00; A01K 63/003
   See application file for complete search history.

(56) References Cited

U.S. PATENT DOCUMENTS

| | | | |
|---|---|---|---|
| 2,140,996 A | | 12/1938 | Heifetz et al. |
| 2,181,016 A | * | 11/1939 | Gross .................... A01G 13/04 47/29.1 |
| 2,300,776 A | * | 11/1942 | Collins ................. A01G 9/029 47/69 |
| 2,508,773 A | | 5/1950 | Reichmuth et al. |
| 2,801,039 A | | 7/1957 | Arneson et al. |
| D157,560 S | | 3/1965 | Berg |
| 3,174,688 A | | 3/1965 | Chatten et al. |
| 3,673,733 A | | 7/1972 | Allen |
| D257,227 S | | 10/1980 | Youngberg |
| D259,768 S | | 7/1981 | Banasiak, Jr. |
| 4,503,636 A | * | 3/1985 | Stuckey ................ A01G 9/122 256/48 |
| D289,143 S | | 4/1987 | Guillaume |
| 6,013,524 A | | 1/2000 | Friars et al. |
| D446,809 S | | 8/2001 | Parker |
| D449,982 S | | 11/2001 | Ferris |
| 9,572,303 B2 | * | 2/2017 | Salojarvi .................. A01G 9/02 |
| 2001/0047951 A1 | | 12/2001 | O'Connor |
| 2005/0274076 A1 | | 12/2005 | Farhadi |
| 2008/0236510 A1 | * | 10/2008 | Silverman .............. A01K 31/08 119/479 |
| 2009/0025287 A1 | * | 1/2009 | Lee .......................... A01G 9/16 47/17 |
| 2013/0305605 A1 | | 11/2013 | Wang |
| 2014/0026474 A1 | * | 1/2014 | Kulas ...................... A01G 9/16 47/1.7 |
| 2014/0196364 A1 | | 7/2014 | Mayner |
| 2014/0279181 A1 | * | 9/2014 | Wills ...................... A01G 27/02 705/26.5 |
| 2015/0089866 A1 | * | 4/2015 | Abbott ................. H05B 47/155 47/58.1 LS |
| 2015/0096225 A1 | * | 4/2015 | Gervais .................... A01G 9/16 47/17 |
| 2017/0079213 A1 | * | 3/2017 | Ahmadi .................. A01G 18/60 |
| 2017/0251642 A1 | * | 9/2017 | Capodice ............. A01K 63/006 |

FOREIGN PATENT DOCUMENTS

| | | | |
|---|---|---|---|
| CN | 104221833 | 12/2014 | |
| CN | 105075731 | 11/2015 | |
| DE | 2600425 | 5/1977 | |
| DE | 202010008547 U1 * | 12/2010 | ........... A01K 63/006 |
| KR | 101464507 | 11/2014 | |
| WO | WO-03037069 A2 * | 5/2003 | ............ A01G 9/246 |
| WO | WO2013108332 | 7/2013 | |
| WO | WO-2016061672 A1 * | 4/2016 | ......... G01N 29/0654 |
| WO | WO2016164652 | 10/2016 | |

OTHER PUBLICATIONS

PCT Search Report and Written Opinion for PCT/US18/24745 Dated Aug. 1, 2018.

* cited by examiner

AUTOMATED TERRARIUM

REFERENCE TO RELATED APPLICATIONS

This application claims priority to U.S. Provisional Application No. 62/482,057, filed Apr. 5, 2017, entitled "Automated Terrarium," and hereby specifically and entirely incorporated by reference.

BACKGROUND

1. Field of the Invention

This invention is directed to automated terrariums and methods for growing plants. The invention is also directed to self-contained terrariums that monitor and regulate the cultivation of medicinal plants.

2. Description of the Background

For thousands of years, humans have cultivated plants for food, herbs and spices, medicine and other health benefits, ornamentation or decoration, and other benefits. Plants are grown and harvested in a variety of way and on a variety of scales, from farms, to backyard gardens, to indoor pots. Each plant requires a certain combination of care so that the plant can grow to its full potential and can produce a desired yield. For example, each plant may require a unique combination of light, temperature, humidity, water, nutrition, and soil or growing medium. Additionally, throughout the growth cycle, the plant must be cared for and maintained. For example, insecticide or fungicide may be needed to prevent the infestation of pests, the soil around the plant may be weeded to prevent competition for resources from other plants, certain plants may need to be properly pruned, plants may need to be replanted if they outgrow their current location, and/or the plant's yield may need to be harvested at the proper time.

With the abundance of factors that may be necessary to grow a plant, there is a need for a system that can monitor the plant throughout its growth cycle and adjust the conditions to grow a plant to its full potential.

SUMMARY

The present invention overcomes the problems and disadvantages associated with current strategies and designs and provides new tools and methods for growing plants.

One embodiment of the invention is directed to an automated terrarium. The terrarium comprises a housing having a base and a lid, wherein the lid is supported by at least one support pillar, at least two transparent side panels supported by the at least one support pillar and positioned between the base and the lid, an irrigation system within the base, a lighting system within the lid, and a control unit, wherein the control unit is adapted to monitor growth of a plant and adjust both the irrigation system and the lighting system.

In a preferred embodiment, at least one of the lid and at least one side panel is openable. Preferably, the control unit is a remote-control unit in communication with a processor within the terrarium. Preferably, the remote-control unit is a smartphone application and the smartphone connects to the terrarium wirelessly. The smartphone application is preferably adapted to control multiple terrariums simultaneously. In a preferred embodiment, the control unit adjusts the irrigation system and lighting system based on the type of plant within the terrarium and a stage of the growth cycle of the plant.

Preferably, the control unit provides instructions to a user regarding setting up the terrarium and maintaining the plant. The instructions for maintaining the plant preferably includes at least one of adding water to the terrarium, adding nutrients to the terrarium, pruning the plant, and harvesting the plant. In a preferred embodiment, the irrigation system comprises at least one moisture sensor in communication with the control unit, at least one water tank, and at least one water supply device. Preferably, the lighting system comprises at least one light sensor in communication with the control unit and a plurality of lights.

The terrarium preferably further comprises a heating system adjustable by the control unit, wherein the heating system comprises at least one temperature sensor and at least one heat source. The terrarium preferably further comprises an air flow system adjustable by the control unit, wherein the air flow system comprises at least one air quality sensor, at least one air vent, at least one fan, and at least one filter. The terrarium preferably further comprises at least trellis for at least one of supporting the plant, manipulating the plant, and maximizing growth or harvest of the plant. The terrarium preferably further comprises at least one blackout blind adapted to block ambient light from entering the terrarium. Preferably, a ratio between the size of the plant the terrarium can accommodate and the size of the terrarium is minimized.

Another embodiment of the invention is directed to a method for growing a plant in an automated terrarium. The method comprises the steps of coupling a control unit to the terrarium, inputting the type of plant to be grown and the growth stage of the pant into the control unit, receiving instructions from the control unit regarding setting up the terrarium based on the type of plant, planting the plant, the control unit monitoring the growth of the plant and adjust an irrigation system and a lighting system, and receiving instructions from the control unit regarding maintaining the plant.

Preferably, the control unit is a remote-control unit in communication with a processor within the terrarium. In a preferred embodiment, the remote-control unit is a smartphone application and the smartphone connects to the terrarium wirelessly. The smartphone application is preferably adapted to control multiple terrariums simultaneously. Preferably, the control unit adjusts the irrigation system and lighting system based on the type of plant within the terrarium and a stage of the growth cycle of the plant. In a preferred embodiment, the instructions for maintaining the plant includes at least one of adding water to the terrarium, adding nutrients to the terrarium, pruning the plant, and harvesting the plant. Preferably, the control unit controls at least one of a heating system and an air flow system within the terrarium.

Other embodiments and advantages of the invention are set forth in part in the description, which follows, and in part, may be obvious from this description, or may be learned from the practice of the invention.

DESCRIPTION OF THE INVENTION

As embodied and broadly described herein, the present invention is directed to automated terrariums that have controllable components using a smart spatial design for maximum showcasing. The controllable components are preferably in communication with a computer, smartphone, tablet, wearable device, dedicated controller, built-in controller or another control device. Preferably the controller provides instructions for setting up the terrarium, maintaining the plant, and harvesting the plant. Preferably, the terrarium is self-contained and monitors and regulates the cultivation of the plant.

Figure 1:
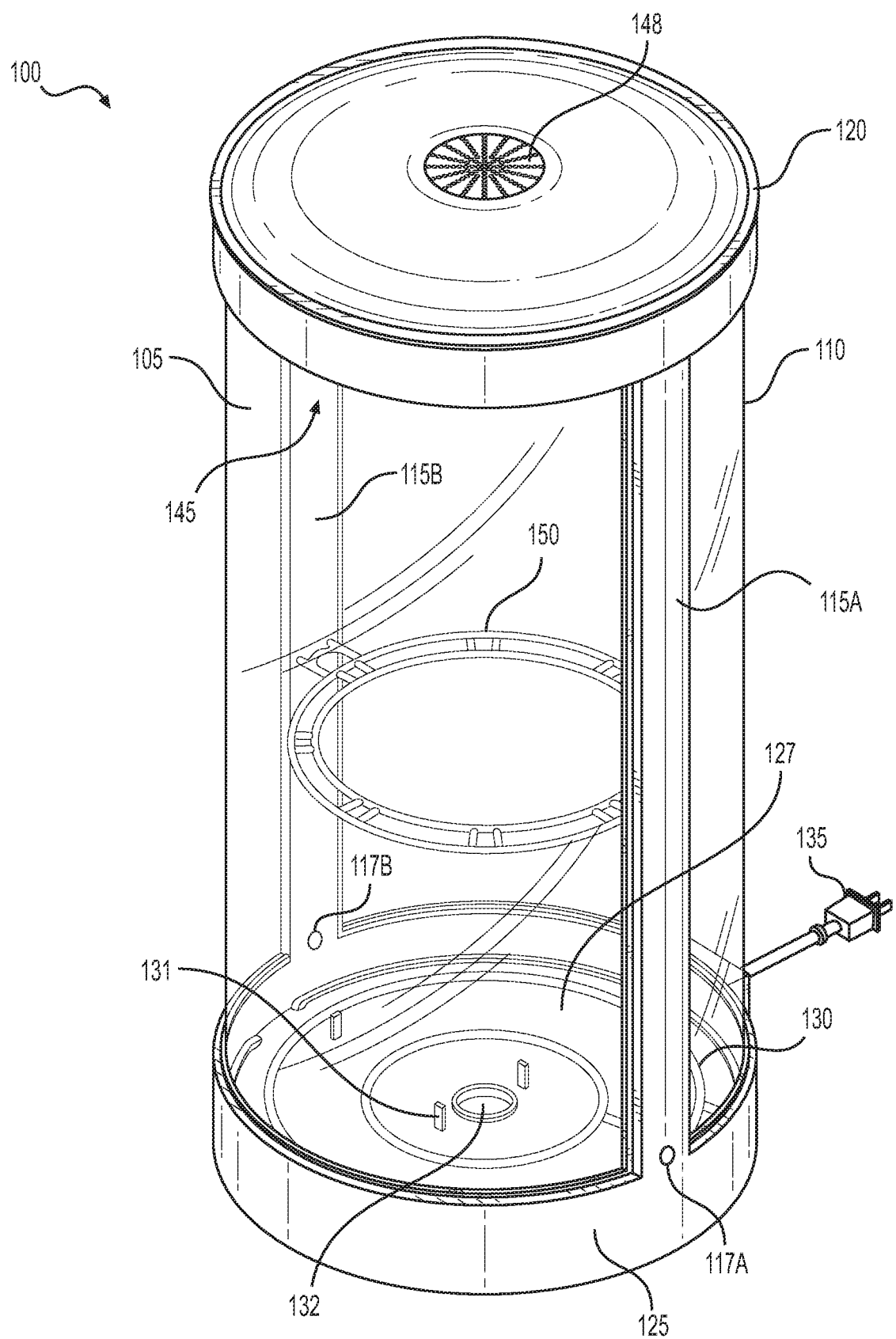
FIG. 1 depicts an embodiment of a terrarium.
Figure 2:
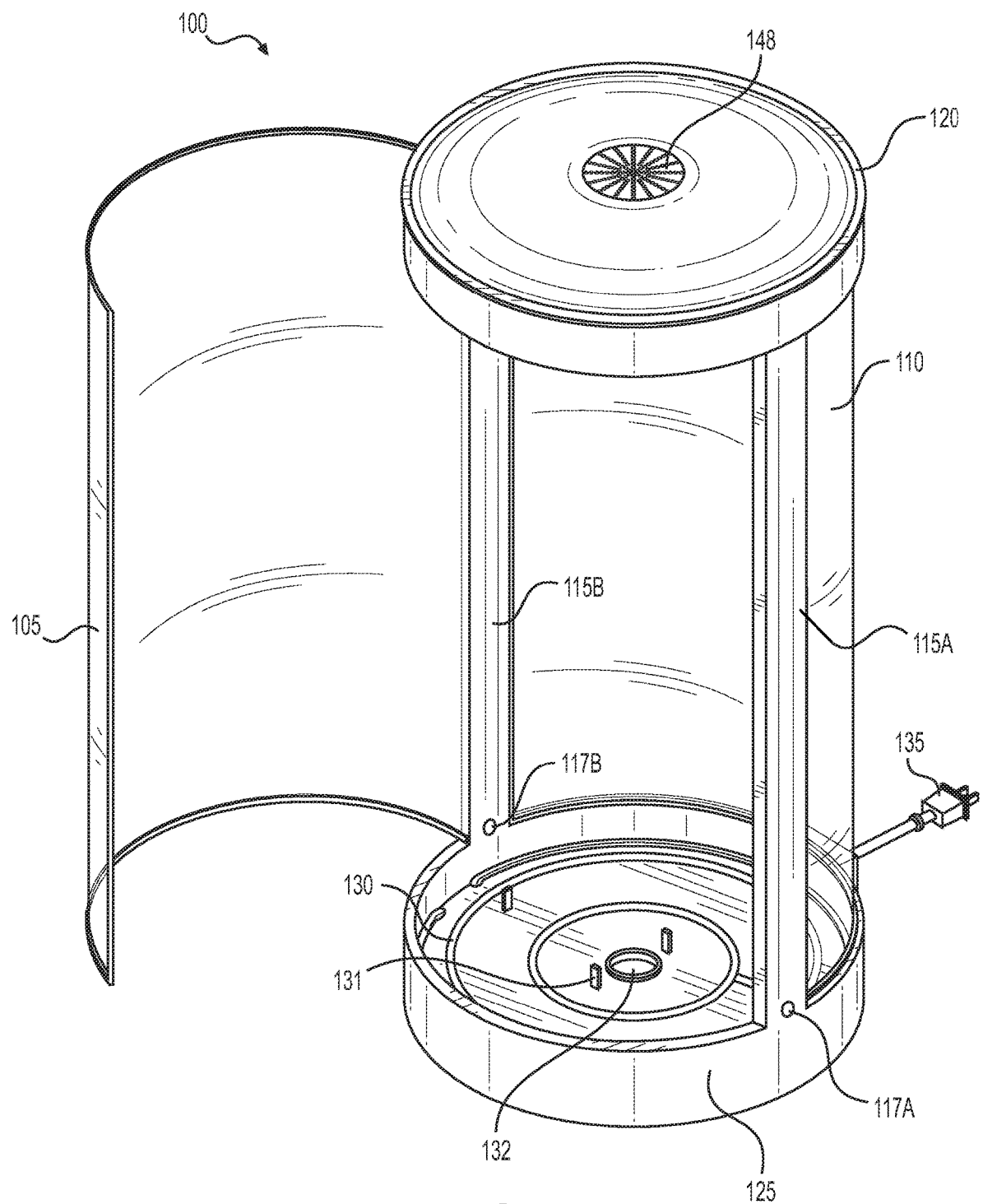
FIG. 2 depicts an embodiment of the terrarium with a door ajar.
Figure 3:
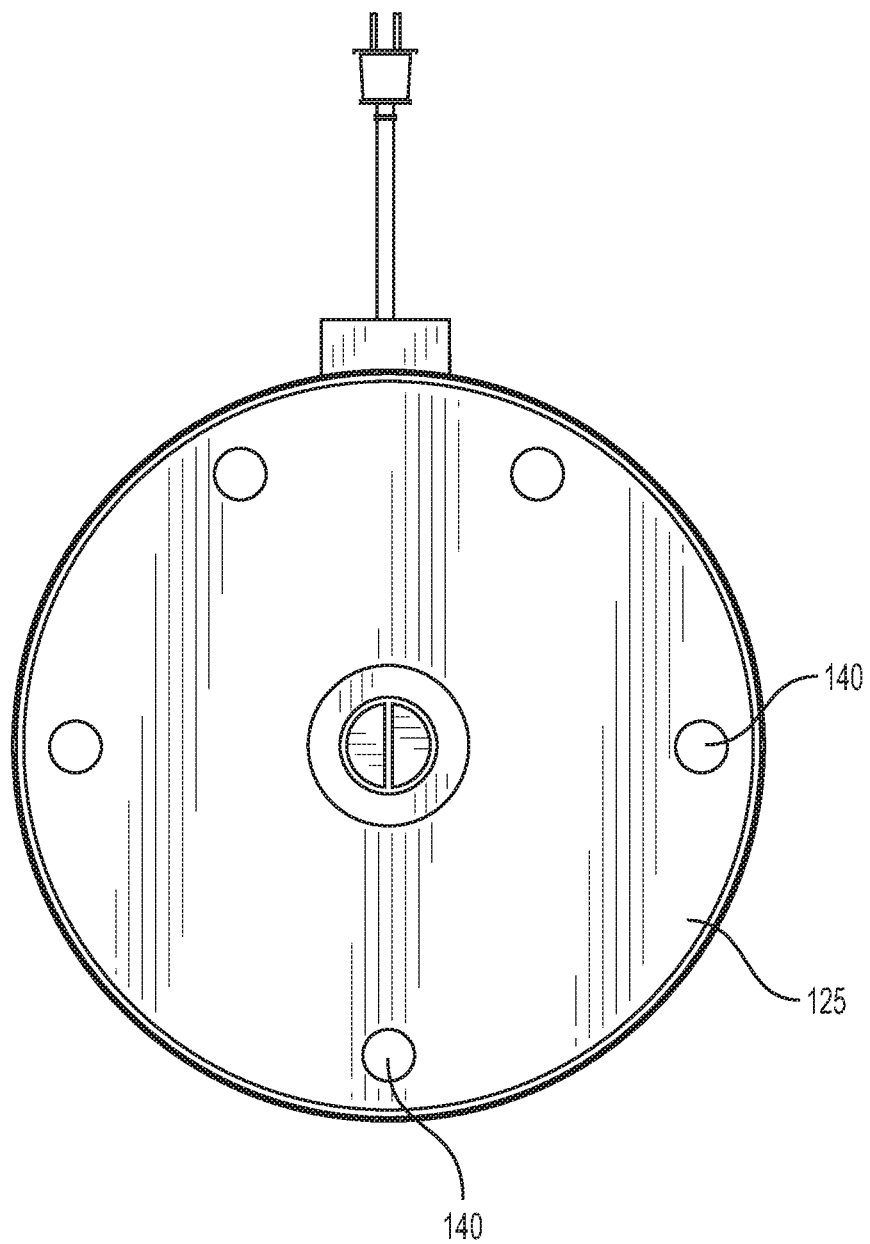
FIG. 3 depicts an embodiment of the bottom of the terrarium.
Figure 7:
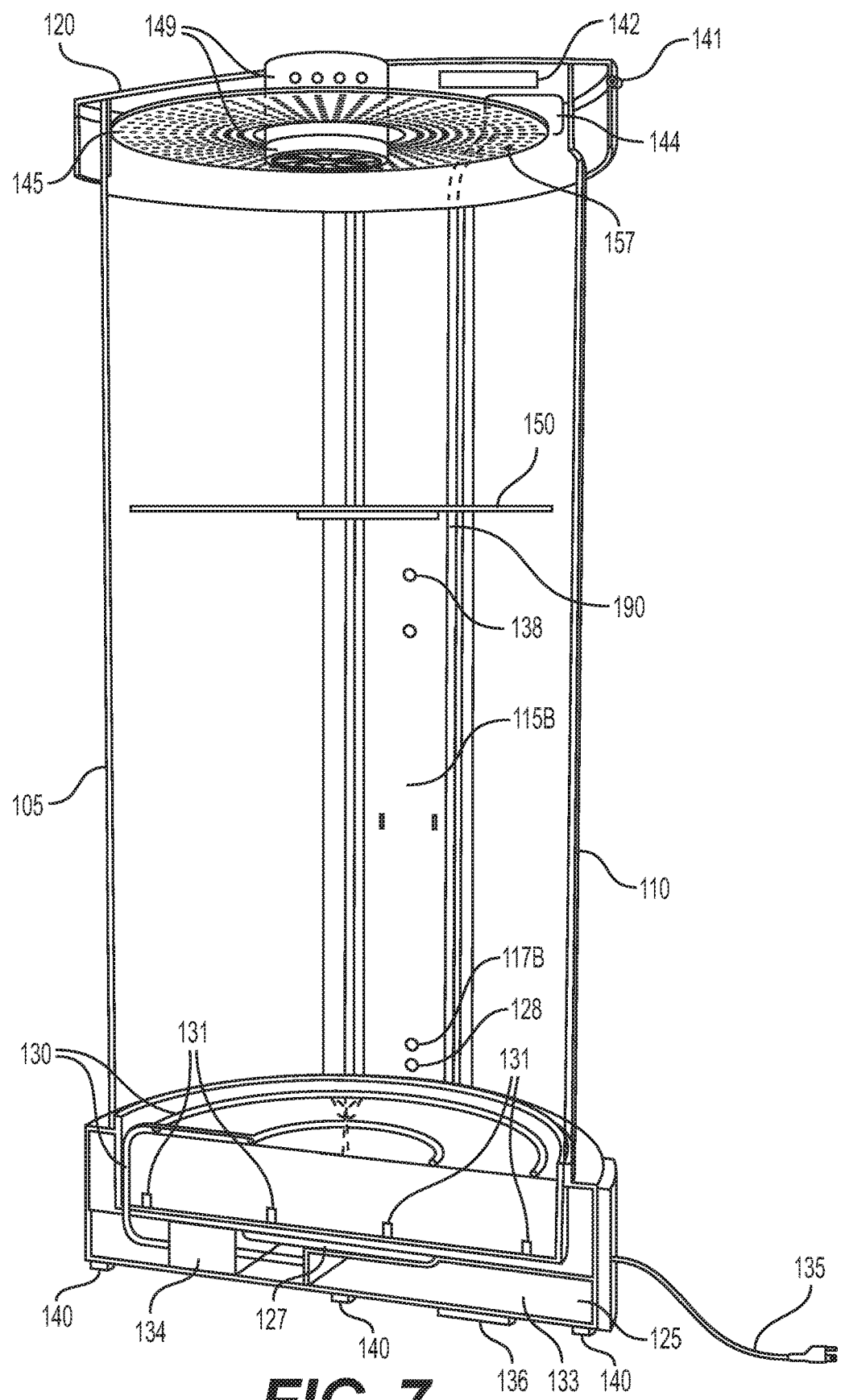
FIG. 7 depicts an embodiment a cutaway view of the terrarium.

FIG. 1 depicts an embodiment of an automated terrarium 100. FIG. 2 depicts terrarium 100 with a door open. FIG. 3 depicts the bottom of terrarium 100. FIG. 7 depicts a cutaway inside view of terrarium 100. Terrarium 100 may be adapted to be placed on a desk, table, shelf, or other support and/or may be adapted to be placed on the floor. Terrarium 100 is preferably cylindrical in shape. However, terrarium 100 can have another shape, for example, terrarium 100 can be cubical, pyramidal, spherical, combinations thereof, or another shape capable of containing one or more plants. Preferably, terrarium 100 has at least one transparent door 105. Transparent door 105 is preferably the front face of terrarium 100 and, as shown in FIG. 2, is adapted to open to provide access to the interior of terrarium 100. The back face 110 of terrarium 100 is preferably also transparent. Back face 110 may be openable or may be fixed. The transparency of door 105 and back face 110 preferably allows ambient light to enter terrarium 100 and provides for any plants within terrarium 100 to be viewed from the outside. Preferably door 105 and back face 100 are made of glass, plexiglass, plastic, crystal, or another transparent material. In other embodiments, door 105 and/or back face 110 may be translucent or opaque. Door 105 and back face 110 (if openable) may be secured in the closed position by magnets, friction, bolts, snaps, clamps, or another fixture. Preferably, once closed, door 105 and back face 110 have seals that are water tight and/or air tight. In certain embodiments, door 105 and/or back face 110 may have one or more blackout blinds to provide darkness to the plant during daylight hours.

Preferably between door 105 and back face 110 are support pillars 115A and 115B. While two support pillars 115A-B are shown, another number of support pillars may be used (for example, 1, 3, 4, or 5). Support pillars 115A-B preferably not only provide support for door 105, back face 110, and lid 120, but also may conceal electrical wires, tubing 190, antennas, or other devices used to cultivate the plant. Toward the bottom of support pillars 115A-B is shown air inlets 117A and 117B. While air inlets 117A-B are positioned at the bottom of pillars 115A-B in the figure, they can be positioned at any location within pillars 115A-B, within lid 120, and/or within base 125. Furthermore, while two air inlets 117A-B are shown any number of air inlets can be used. Preferably, air inlets 117A-B allow ambient air to flow into and out of terrarium 100. Air inlets 117A-B may be closeable, fixed in an open position, adjustable, remotely controlled, manually controlled, have filters, have screens, and/or combinations thereof.

Preferably at least one of pillars 115A-B has a trellis 150 attached. Trellis 150 is preferably a ring of material that is adapted to support the plant and/or the plant's leaves, fruit, buds, flowers, stem, or other part. Additionally, trellis 150 may also help to spread out the leaves of the plant to maintain proper light exposure and center the plant within terrarium 100. Trellis 150 may also be reversible to support the plant upside down to, for example allow the plant's final nutrients to seep into the buds at the tip of the plant's branches and to dry once harvested. Preferably, the plant grows through the middle of trellis 150. While one trellis 150 is shown, two, three, or more trellises can be used depending on the size of terrarium 100 and the size of the plant. Furthermore, trellis 150 may be adapted to have different positions on pillars 115A-B depending on the size of the plant and the plant's growth stage. For example, trellis 150 may be moveable to accommodate the growing plant. Trellis 150 may be a ring or have another shape and may be smooth or may have protrusions, knurling, or other devices to help support the plant.

Preferably, base 125 is adapted to hold the soil or growth medium as well as the plant. Base 125 may contain a liner to hold the soil for easier removal and cleanup of terrarium 100. In other embodiments, terrarium may be hydroponic and base 125 is adapted to hold water. Within base 125 preferably is a heating pad 127. One or more temperature sensors 128 may be adjacent to or within base 125. Temperature sensor 128 and heating pad 127 preferably work in conjunction to maintain a proper temperature of the soil and within terrarium 100. For example, if temperature sensor 128 determines that the soil is too cold for proper plant growth, temperature sensor 128 will instruct heating pad 127 to turn on. Likewise, if temperature sensor 128 determines that the soil is too hot for proper plant growth, temperature sensor 128 will instruct heating pad 127 to turn off. While temperature sensor 128 is shown as positioned adjacent to base 125, temperature sensor 128 may be placed within lid 120 or at another location within terrarium 100.

Additionally, base 125 preferably contains at least one irrigation system 130 adapted to provide water, food, fertilizer, medication, and/or other nutrients to the plant. Irrigation system 130 may be a drip irrigation system, a sprinkler, a surface irrigation system, a subsurface textile irrigation system, another irrigation system, or combinations thereof. Preferably, irrigation system 130 is positioned under the soil to directly feed the plant. However, irrigation system 130 may be placed above the soil and/or in lid 120. Irrigation system 130 preferably works in conjunction with moisture sensor 131 to maintain proper hydration of the plant. For example, if moisture sensor 131 determines that the soil is too damp for proper plant growth, moisture sensor 131 will instruct irrigation system 130 to turn off. Likewise, if moisture sensor 131 determines that the soil is too dry for proper plant growth, moisture sensor 131 will instruct irrigation system 130 to turn on. While moisture sensor 131 is shown as positioned within base 125, moisture sensor 131 may be placed within lid 120 or at another location within terrarium 100. Additionally, multiple moisture sensors 131 can be used and the system may be able to irrigate specific areas within terrarium 100 based on the moisture readings from each moisture sensor.

Additionally, base 125 may have one or more water drains 132 to drain excess water from the soil. Preferably, water drain 132 drains to water tank 133, which holds water to water the plant or until a user empties water tank 133. Terrarium 100 may recycle water and/or may separate used water from fresh water in separate water tanks. Irrigation system 130 is preferably fed by water tank 133 using water pump 134. Hoses, pumps, valves and other fluid control devices may also be used to transport the water from the water tank 133 to irrigation system 130. In another embodiment, the water tank may be stored in lid 120. Additionally, the water tank may contain one or more receptacles for holding and dispensing fertilizer, medication, and other nutrients that may be needed by the plant. The water tank may also contain a water level sensor 136 (e.g. a pressure sensor, ultrasonic sensor, or a float switch) that indicates when the water drops below a predetermined threshold.

Base 125 may further include a power source 135 and any necessary power converters. While a A/C plug is shown as power source 135, terrarium may be battery powered, solar powered, powered by a USB connection, or have another source of power. Additionally, terrarium 100 may have a backup source of power for instances when the electricity goes out. Base 125, lid 120, and/or supports 115A-B may additionally have one or more light sensors 138 to determine if the plant is receiving sufficient light and if the plant is receiving the proper combination of light (e.g. UV, color, and/or intensity).

As can be seen in FIG. 3, preferably, base 125 has a plurality of feet 140 to support terrarium 100. Feet 140 are preferably made of a non-skid material to help prevent terrarium 100 from moving. For example, feet 140 may be rubber, plastic, or coated in an adhesive. In other embodiments, feet 140 may be designed to help move terrarium 100. For example, feet 140 may be casters, bearings, or slick surfaces.

Lid 120 is preferably adapted to open to allow access the computing system 142 and to fill the water tank via water funnel 144. For example, lid 120 may be completely removable or may have a hinge 141 to allow lid 120 to swing open. Preferably lid 120 contains one or more lights 145. Each light 145 may be an incandescent bulb, an LED bulb, a CFL bulb, or another light source. Furthermore, in embodiments with multiple bulbs, each bulb may be the same or there may be a variety of bulbs. For example, there may be bulbs of different hues, different intensities, and different light spectrums. Preferably the lights are controllable to output different preset light schemes. The light schemes may be based on the growth stage of the plant and/or may be used to augment the ambient light. Lid 120 preferably contains air holes 148. Air holes 148 may allow fluid communication between terrarium 100 and the ambient air. Lid 120 may have a fan and/or a filter 149 (e.g. activated carbon) to control the ingress and egress of air into terrarium 100. Preferably, the filter is adapted to filter out odors associated with the growth cycle from exiting the terrarium. Preferably, the user is notified when it is time to replace the filter (e.g. after 2 grow cycles, after 4 grow cycles, or another time period). The air flow within terrarium 100 may be controlled by an air quality sensor 151. Preferably, the air flow system works in conjunction with air inlets 117A-B to create a constant flow of air thought the terrarium. The air quality sensor 151 may be able to determine if the $O_2$ and $CO_2$ levels within the terrarium are acceptable, if there are pathogens in the air of terrarium 100, the humidity levels within terrarium 100, and/or if certain diseases are present based on molecules found in the air of the terrarium 100.

Figure 6:
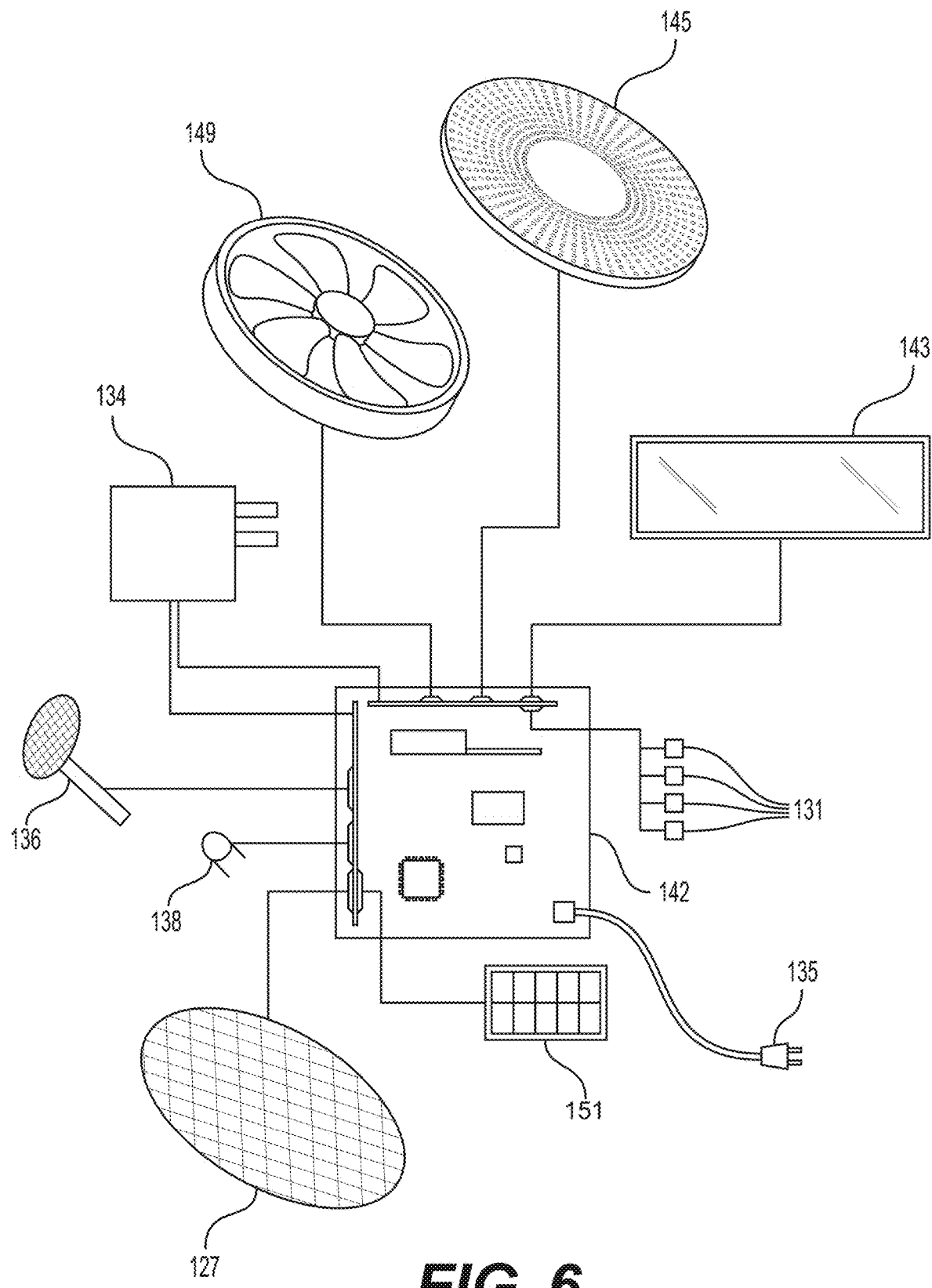
FIG. 6 depicts an embodiment of the elements connected to the computing device.

Preferably lid 120 also contains a computing system 142 adapted to control the various systems within terrarium 100. However, the computing system may be placed in the base or another location within or without terrarium 100. Preferably, computing system 142 has an LCD touchscreen input 143. The computing system may be adapted to, for example, to automatically control the irrigation and nutrition system, the heating system, the lighting system, and the air flow system. Additionally, the computing system may be adapted to communicate with an external or internal controller. FIG. 6 depicts a schematic of the elements connected to computing system 142.

Figure 8:
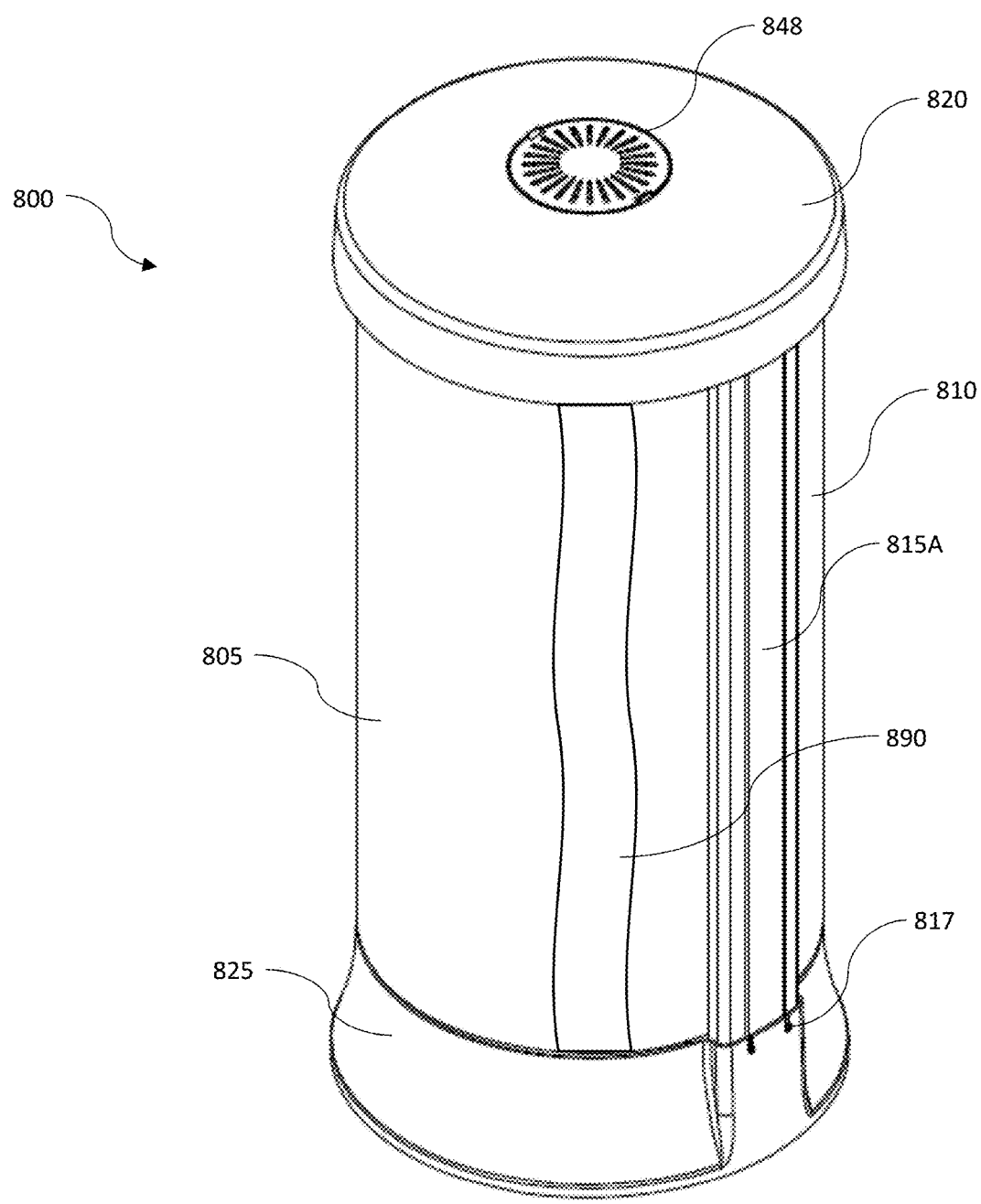
FIG. 8 depicts a second embodiment of the terrarium.
Figure 9:
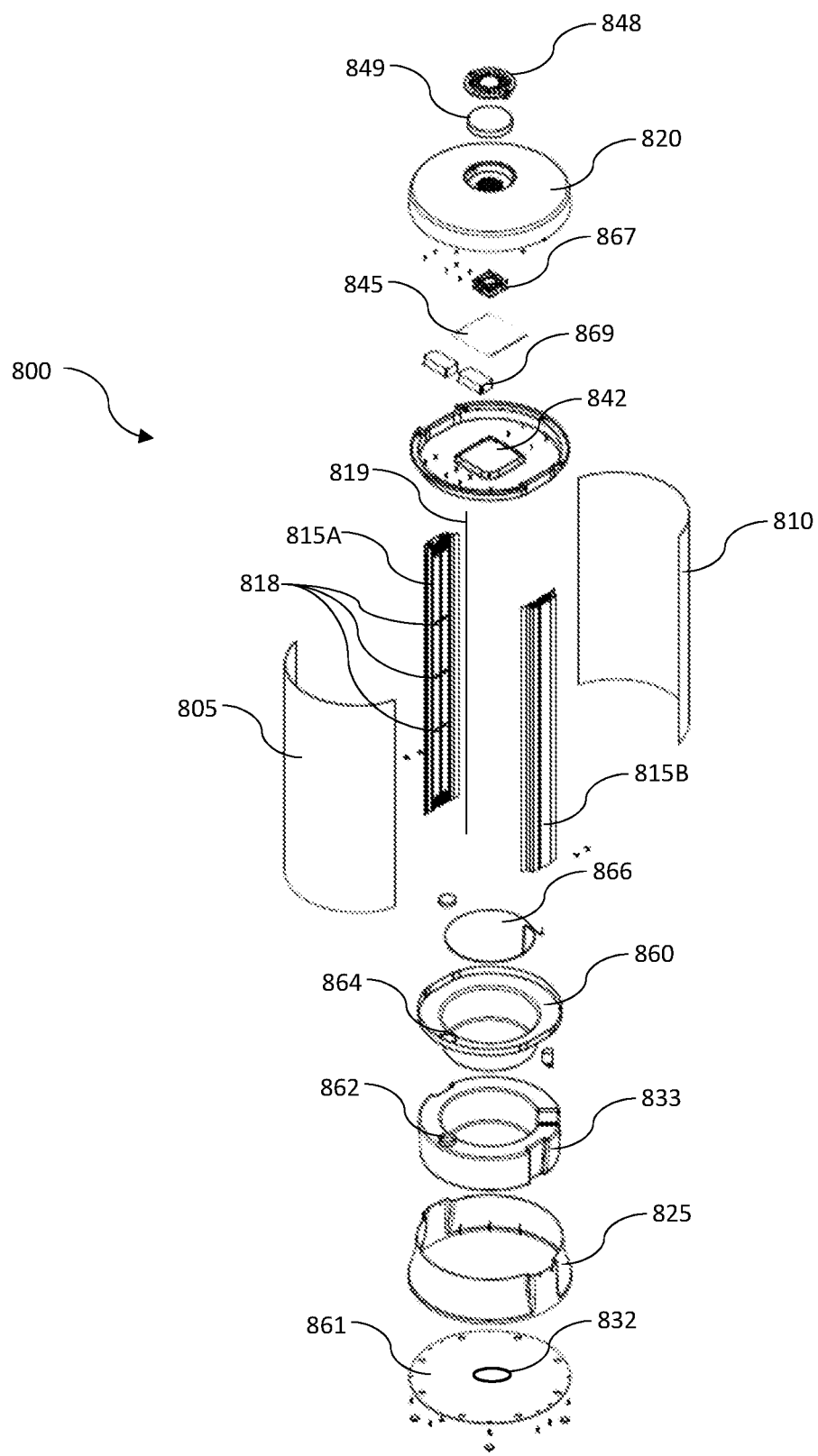
FIG. 9 depicts an exploded view of the second embodiment of the terrarium.

FIGS. 8 and 9 depict another embodiment of a terrarium 800. Similar element numbers in the embodiment depicted in FIGS. 1-3 and 7 and the embodiment depicted in FIGS. 8-9 indicate similar elements. Furthermore, elements depicted and/or described with respect to one embodiment may be used on the other embodiment. The control system of both embodiments is also interchangeable with components of one control system being deployable in the other control system.

FIG. 8 depicts an embodiment of an automated terrarium 800. FIG. 9 depicts an exploded view of terrarium 800. Terrarium 800 may be adapted to be placed on a desk, table, shelf, or other support and/or may be adapted to be placed on the floor. Terrarium 800 is preferably cylindrical in shape. However, terrarium 800 can have another shape, for example, terrarium 800 can be cubical, pyramidal, spherical, combinations thereof, or another shape capable of containing one or more plants. Preferably, terrarium 800 has at least one transparent door 805. Transparent door 805 is preferably the front face of terrarium 800 and is adapted to open to provide access to the interior of terrarium 800. The back face 810 of terrarium 800 is preferably also transparent. Back face 810 may be openable or may be fixed. The transparency of door 805 and back face 810 preferably allows ambient light to enter terrarium 800 and provides for any plants within terrarium 800 to be viewed from the outside. Preferably door 805 and back face 800 are made of glass, plexiglass, plastic, crystal, or another transparent material. In other embodiments, door 805 and/or back face 810 may be translucent or opaque. Door 805 and back face 810 (if openable) may be secured in the closed position by magnets, friction, bolts, snaps, clamps, or another fixture. Preferably, once closed, door 805 and back face 810 have seals that are water tight and/or air tight. In certain embodiments, door 805 and/or back face 810 may have one or more blackout blinds 890 to provide darkness to the plant during daylight hours.

Preferably between door 805 and back face 810 are support pillars 815A and 815B. While two support pillars 815A-B are shown, another number of support pillars may be used (for example, 1, 3, 4, or 5). Support pillars 815A-B preferably not only provide support for door 805, back face 810, and lid 820, but also may conceal electrical wires 819, tubing, antennas, or other devices used to cultivate the plant. Additionally, support pillars 815A-B preferably support one or more trellises at trellis support positions 818. Toward the bottom of support pillars 815A-B is shown air inlets 817. While air inlets 817 are positioned at the bottom of pillars 815A-B in the figure, they can be positioned at any location within pillars 815A-B, within lid 820, and/or within base 825. Furthermore, while two air inlets 817 are shown any number of air inlets can be used. Preferably, air inlets 817 allow ambient air to flow into and out of terrarium 800. Air inlets 817 may be closeable, fixed in an open position, adjustable, remotely controlled, manually controlled, have filters, have screens, and/or combinations thereof.

Preferably, base 825 is adapted to hold the soil or growth medium as well as the plant. Additionally, base 825 preferably contains at least one irrigation system adapted to provide water, food, fertilizer, medication, and/or other nutrients to the plant. The irrigation system may be a drip irrigation system, a sprinkler, a surface irrigation system, a subsurface textile irrigation system, another irrigation system, or combinations thereof. The irrigation system is preferably fed by water tank 833 using a water pump. Hoses, pumps, valves and other fluid control devices may also be used to transport the water from the water tank 833 to the irrigation system. The water tank may contain one or more receptacles for holding and dispensing fertilizer, medication, and other nutrients that may be needed by the plant. The water tank may also contain a water level sensor (e.g. a pressure sensor, ultrasonic sensor, or a float switch) that indicates when the water drops below a predetermined threshold.

Preferably, water tank 833 is doughnut shaped thereby allowing sufficient water storage while providing the plant with a depth of growth medium sufficient to allow for proper root growth. Water tank 833 preferably has an opening 862 to allow water, food, fertilizer, medication, and/or other nutrients to the plant to be added to water tank 833. Preferably, soil liner 860 is adapted to fit within the central opening of water tank 833. Soil liner 860 preferably has a rim that fits over water tank 833 and the entirety of the interior of the base 825 so that any spill from watering goes directly in the soil. Soil liner 860 may have a mating hole 864 adapted to fit over opening 862 to allow a user to add water to tank 833 without removing soil liner 860. Optionally, a heating plate or element 866 may be placed within soil liner 860. Base 825 may also have a base plate 861 with or without a drain plug 832 to support terrarium 800.

Lid 820 is preferably adapted to open to allow access the computing system 842. For example, lid 820 may be completely removable or may have a hinge to allow lid 820 to swing open. Preferably lid 820 contains one or more lights 845. Each light 845 may be an incandescent bulb, an LED bulb, a CFL bulb, or another light source. In a preferred embodiment, light 845 is printed circuit board array of LED lights. Furthermore, in embodiments with multiple bulbs, each bulb may be the same or there may be a variety of bulbs. For example, there may be bulbs of different hues, different intensities, and different light spectrums. Preferably the lights are controllable to output different preset light schemes. The light schemes may be based on the growth stage of the plant and/or may be used to augment the ambient light.

Lid 820 preferably contains air hole 848. Air holes 848 may allow fluid communication between terrarium 800 and the ambient air. Lid 820 may have one or more fans 867 and/or a filter 849 (e.g. activated carbon) to control the ingress and egress of air into terrarium 800. Preferably, the filter is adapted to filter out odors associated with the growth cycle from exiting the terrarium. Preferably, the user is notified when it is time to replace the filter (e.g. after 2 grow cycles, after 4 grow cycles, or another time period). The air flow and temperature within terrarium 800 may be controlled by an air quality sensor and/or thermometer 895. Preferably, the air flow system works in conjunction with air inlets 817 to create a constant flow of air throughout the terrarium. The terrarium 800 and lid 820 are preferably air tight except for one speed-controlled fan blowing through filter 849 in the lid. This fan is preferably always on to a certain degree, so some amount of fresh air is always being pulled up from the inlets 817 in the base 825. Some of the air is preferably pulled up through the plant to the lid 820. A second fan preferably pushes the air within lid 820 across a heat sink 869 of the lights 845. This preferably cools the lights allowing them to be brighter and also warms the air in the lid 820. The warm lid air is preferably pushed back into the terrarium 800 by a third fan, thereby creating air circulation around the plants. The airflow system preferably also controls the temperature of the terrarium. If the terrarium temperature gets to high the system is programmed to increase the speed of the output air filtered fan in the lid 820, thereby drawing in more cooler air through inlets 817 and until the desired chamber temperature is reached.

Preferably lid 820 also contains a computing system 842 adapted to control the various systems within terrarium 800. However, the computing system may be placed in the base or another location within or without terrarium 800. The computing system may be adapted to, for example, to automatically control the irrigation and nutrition system, the heating system, the lighting system, and the air flow system. Additionally, the computing system may be adapted to communicate with an external or internal controller. FIG. 6 depicts a schematic of the elements connected to computing system 842.

Figure 4:
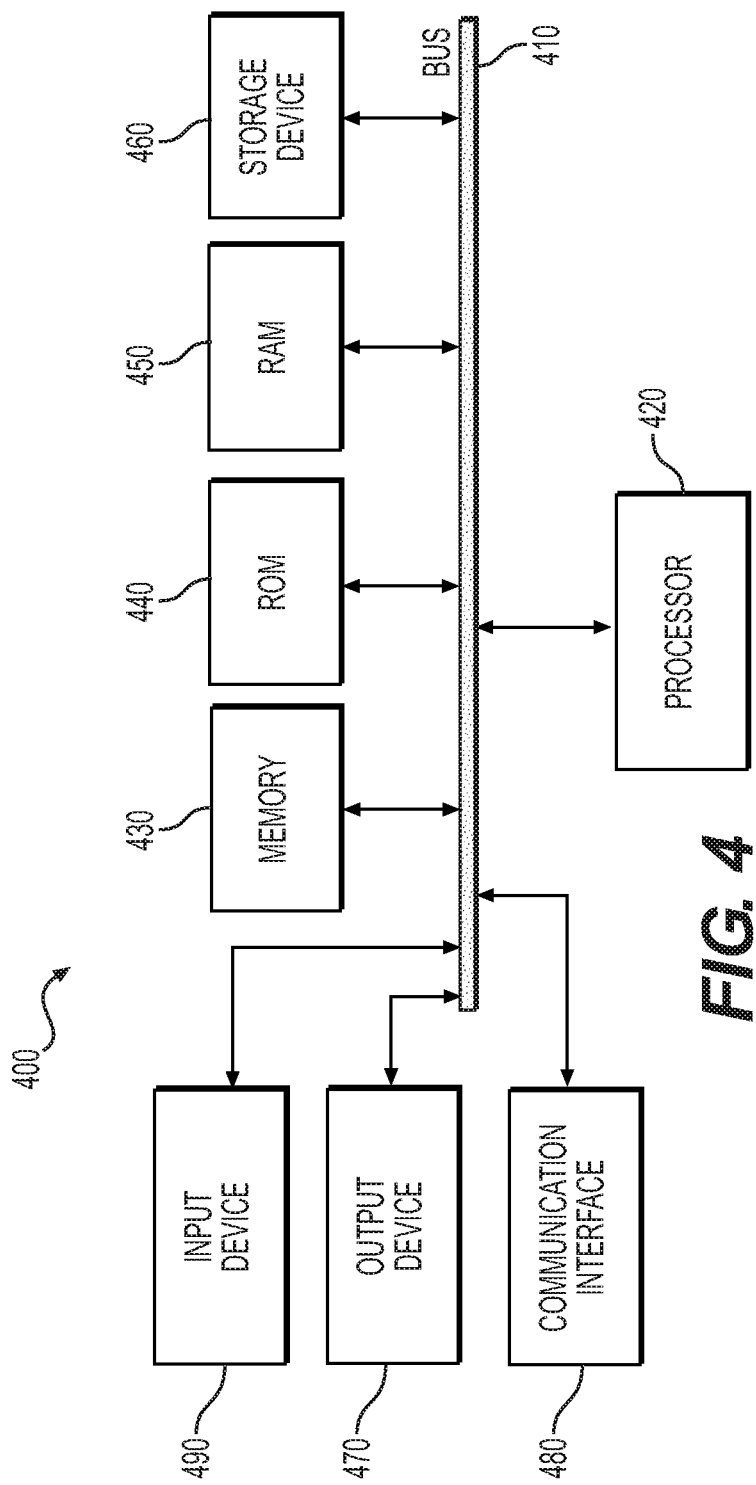
FIG. 4 depicts an embodiment of a method of using the terrarium.

FIG. 4 depicts an exemplary computing system that includes at least computing device 400, including a processing unit (CPU) 420 and a system bus 410 that couples various system components including the system memory such as read only memory (ROM) 440 and random access memory (RAM) 450 to the processing unit 420. Other system memory 430 may be available for use as well. It can be appreciated that the invention may operate on a computing device with more than one CPU 420 or on a group or cluster of computing devices networked together to provide greater processing capability. The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices such as a hard disk drive 460, a magnetic disk drive, an optical disk drive, a flash memory drive, tape drive or the like. The storage device 460 is connected to the system bus 410 by a drive interface. The drives and the associated computer readable media provide nonvolatile storage of computer readable instructions, data structures, program modules and other data for the computing device 400. The basic components are known to those of skill in the art and appropriate variations are contemplated depending on the type of device, such as whether the device is a small, handheld computing device, a desktop computer, a computer server, a handheld scanning device, or a wireless devices, including wireless Personal Digital Assistants ("PDAs"), tablet devices, wireless web-enabled or "smart" phones (e.g., Research in Motion's Blackberry™, an Android™ device, Apple's iPhone™), other wireless phones, a game console (e.g., a Playstation™, an Xbox™ or a Wii™), a Smart TV, a wearable internet connected device, combinations thereof, etc. Preferably, the system is technology agnostic. Communication can occur over any communications network known in the art, including but not limited to wired networks, wireless networks, Zigbee networks, Bluetooth networks, Z-wave networks, WiFi networks, WiMax networks, RF networks, local area networks (LAN), internet networks, wide area networks (WAN), cellular telephone network, 900 MHz wireless networks, and satellite networks. In other embodiments the controller may be directly wired or otherwise coupled to terrarium 100. The controller may be able to control multiple terrariums 100 simultaneously and may be able to differentiate between the various terrariums 100.

Although the exemplary environment described herein employs a flash memory device, it should be appreciated by those skilled in the art that other types of computer readable media which can store data that are accessible by a computer, such as magnetic cassettes, hard disks, digital versatile disks, cartridges, random access memories (RAMs), read only memory (ROM), a cable or wireless signal containing a bit stream and the like, may also be used in the exemplary operating environment.

To enable user interaction with the computing device 400, an input device 490 represents any number of input mechanisms, such as a microphone for speech, a touch-sensitive screen for gesture or graphical input, keyboard, mouse, motion input, speech, game console controller, TV remote, sensors, and so forth. The output device 470 can be one or more of a number of output mechanisms known to those of skill in the art, for example, device controllers, printers, monitors, screens, projectors, speakers, and plotters. In some embodiments, the output can be via a network interface, for example uploading to a website, emailing, attached to or placed within other electronic files, and sending an SMS or MMS message. In some instances, multimodal systems enable a user to provide multiple types of input to communicate with the computing device 400. The communications interface 480 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example, the functions of one or more processors presented in FIG. 4 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate the preferred embodiments of the invention may be practiced in network computing environments with many types of computer system configurations, including personal computers, handheld devices, multi-processor systems, microprocessor-based or programmable consumer electronics, network PCs, minicomputers, mainframe computers, and the like. Networks may include the Internet, one or more Local Area Networks ("LANs"), one or more Metropolitan Area Networks ("MANs"), one or more Wide Area Networks ("WANs"), one or more Intranets, etc. Embodiments may also be practiced in distributed computing environments where tasks are performed by local and remote processing devices that are linked (either by hardwired links, wireless links, or by a combination thereof) through a communications network, e.g. in the "cloud." In a distributed computing environment, program modules may be located in both local and remote memory storage devices.

Figure 5:
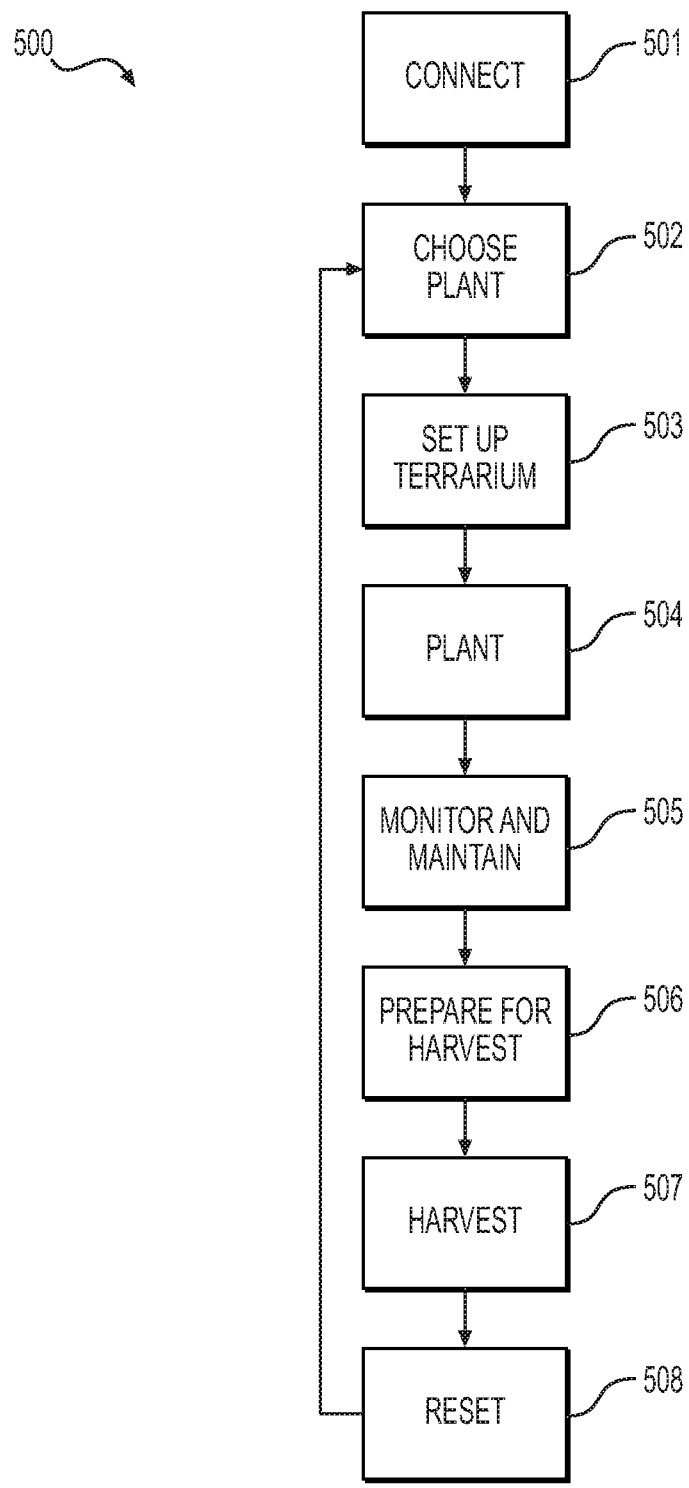
FIG. 5 depicts an embodiment of a computing device.

FIG. 5 depicts a method 500 of using terrarium 100. At step 501, a user may connect their terrarium with a remote processing center via a smartphone application or a computer (i.e. the control device) or the terrarium may be able to connect to the control device without the remote processing center. Preferably, the remote processing center provides the terrarium or the control device the data and instructions necessary to automate the growing of the plant. In other embodiments, the terrarium is self-sufficient and no external devices are necessary and the terrarium comes preinstalled with the necessary information or the information can be inputted by the user. Additionally, but connecting the terrarium to the control device, the control device may be able to receive signals from the various sensors as described herein and provide control instructions to the various systems described herein.

The user preferably then chooses the plant or plants to grow at step 502. Choice of plant may include, for example, flowering plants, herbs, medicinal plants, cannabis, saplings, house plants, outdoor plants, tropical pants, fruiting plants, vegetables, mosses, fungi, cacti, grasses, water plants, or other types of plants. While terrarium 100 is preferably adapted to grow a single plant at a time, terrarium 100 may be adapted to grow multiple plants, all of the same variety or of different varieties, at the same time. Furthermore, terrarium 100 may be adapted to care for multiple plants all at the same stage of development or at various stages of development. Once the plant or plants are chosen, the user selects the proper plant(s) on the control device or on the terrarium.

At step 503, the user preferably prepares terrarium 100. For example, the user may have to test and treat the water to ensure it has a proper pH level, mineral content, bacteria and/or algae content, other pathogen level, or another component level. The treatment of the water may be required with each refilling of the water basin, depending on the water quality. The user may also have to prepare the soil or growth medium (e.g. coconut husks, peat moss, sand, pumice, compost, or another material that facilitates plant growth) and place it within the terrarium. For example, additives may need to be mixed into the soil or growth medium and the soil or growth medium may have to be placed in a specific arrangement with regard to the irrigation system. Additionally, the user may have to add the correct nutrients to the terrarium to facilitate plant growth. Preferably, the control device provides instructions to the user regarding preparing the terrarium based on the chosen plant(s).

The plant(s) are planted at step 504. Preferably, the plant starts as a germinated seed placed on or within the soil or growth medium as directed by the control device. However, the plant may start as a seed or a plant that has already started to grow. For some plants, it may be necessary to plant multiples and then weed out the weaker or slower growing plant(s). At the time of planting, the user preferably inputs the date and/or time of the planting to the control device so that the control device can begin to monitor the terrarium. The user may also input the development stage or age of the plant so that the control device can regulate the terrarium based on growth expectations.

At step 505, in combination, the user and the control device will monitor and maintain the plant. For example, based on information obtained by the control device from the various sensors, the control device may alert the user that water levels and/or nutrition levels are low and instruct the user to add water and/or nutrients and how much of each to add. Watering may change during the growth cycle of the plant. For example, for a 10 week growth cycle, the water tank may be filled 1-2 times in the first two weeks. During weeks three through eight, the water tank may be filed 6-7 times. Finally, during the last two weeks, the water tank may be filled 2-3 times.

The control device may additionally alert the user that certain pesticides or fungicides may be needed based on determined pests or other unwanted conditions found within the terrarium. Preferably, after each action is taken by the user, the user will input to the control device what action was taken. Based on a visual inspection by the user or as directed by the control device, the user may prune the plant or trellis the plant. For example, a predetermined number of days after planting, the control device may alert the user that the plant needs to be pruned and/or trellised. The control device may provide visual and/or audible instructions on how to prune and/or trellis the plant.

At step 506, the control device may prepare the plant for harvesting. The preparation for harvesting step is optional as not all plants are harvested. Such preparation may include adjusting the lighting schedule, adjusting the watering and/or feeding schedule, adjusting the temperature, or another adjustment that helps promote growth and/or ripening of the portion of the plant to be harvested. The preparation of the plant for harvest preferably occurs at a predetermined amount of time after planting. However, the data from the various sensors within the terrarium may be used to determine that the plant is nearing harvest time. For example, if ethylene gas levels pass a predetermined threshold, the control device may determine that the harvest is approaching.

At step 507, the harvest begins. The harvesting step is optional as not all plants are harvested. Depending on the type of plant, the control device preferably provides visual and/or audible instructions to the user about how to harvest the plant. For certain plants (e.g. tomatoes, peppers, strawberries) multiple harvests may occur while for other plants (e.g. herbs, lettuces, cauliflower) there will be only a single harvest. For some plants the terrarium may be used as part of the harvesting step. For example, if the plant needs to be dried out prior to consumption, the desired portions of the plant may be removed from the roots and the plant may be hung upside-down within the terrarium, for example by the trellis. The control system may then provide instructions to the terrarium to reduce moisture and increase airflow within the terrarium, thereby assisting in the drying process. The control device may also change the light settings to further increase drying of the plant. In other embodiments, the user may have to manually set the drying functions of the terrarium. Once the plant is fully harvested or the plant otherwise reaches the end of its growth cycle, the user may input to the control device that the growth cycle is completed and the control device will stop monitoring the terrarium until the next plant is planted.

At step 508, the terrarium is reset for the next growth cycle. Resetting may include cleaning out the terrarium and starting with an empty terrarium or may include reusing some or all of the soil, growth medium, water, nutrients, or other additives from the previous growth cycle. By selectin the next plant to grow on the control device, the control device will let the user know what needs to be replaced and what can be kept from the previous growth cycle. Resetting the terrarium may also include cleaning out the terrarium. For example, the various surfaces may need to be cleaned (e.g. with a plant safe cleaning agent), the water tank may need to be emptied and cleaned, the filters may need to be cleaned or replaced, and/or the tubes and hoses may need to be cleaned out.

The terrarium preferably is spatially designed to produce the greatest yield for the plant in the smallest size unit possible. Preferably the components of traditional terrariums are minimized or eliminated while maintaining the ability to grow a plant. For example, the irrigation system in the terrarium disclosed herein has be minimized. Having a user fill the tank allows for a smaller tank and eliminates parts necessary for an external water line hook up. Furthermore, an entire nutrient automation system can be eliminated. By placing the water fill funnel in the lid not is watering simplified, but the need to access the water tank in the base is eliminated, thereby allowing the soil liner to take up more space which minimizes the overall size. Having to water sensor system with independent hoses uses less water in certain plant growth stages allowing for less water tank fills. The size of the holes in the perforated water tubes allows for even watering of the plant. By including a waterproof ultrasonic sensor in the top of the water tank the need for larger sensor systems can be eliminated.

As another example, the air filtration system found in traditional terrariums may be minimized. By keeping the terrarium air tight and putting the air inlets in towards the base of the plant and the fan at the top the air is pulled into the terrarium from the bottom. Plants take in $CO_2$ from the bottom of their leaves. By keeping the grow chamber air tight and putting holes in the filtration cylinder (the cylinder the air is pulled through and eventually escaping out of the top) above the LEDs the fan serves a dual purpose of cooling the LEDs and providing filtration, thereby eliminating the need for a dedicated LED cooling Fan. The temperature control of the terrarium can be minimized over traditional terrariums by placing the heating pad under the soil liner. The temperature of the plant's most vulnerable area can be controlled, thereby allowing the elimination of parts that control the grow chamber's temperature. Furthermore, selecting the right PAR color diodes, quality of diodes and position of diodes minimizes the amount of lights needed, which minimizes the size of the lid.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, where ever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. An automated terrarium, comprising:
   a housing having a base and a lid, wherein the lid is supported above the base by at least one support pillar;
   at least two transparent side panels supported by the at least one support pillar and positioned between the base and the lid;
   a plant growth medium within the base;
   an irrigation system within the base;
   a lighting system within the lid;
   a temperature and air quality control system;
   at least one trellis ring extending from the at least one support pillar; and
   a control unit, wherein the control unit is adapted to monitor growth of a plant and adjust the irrigation system, the lighting system, and the temperature and air quality control system.

2. The automated terrarium of claim 1, wherein at least one of the lid or at least one side panel is openable.

3. The automated terrarium of claim 1, wherein the control unit is a remote-control unit in communication with a processor within the terrarium.

4. The automated terrarium of claim 3, wherein the remote-control unit is a smartphone with an application and the smartphone connects to the terrarium wirelessly.

5. The automated terrarium of claim 4, wherein the smartphone application is adapted to control multiple terrariums simultaneously.

6. The automated terrarium of claim 1, wherein the control unit adjusts the irrigation system and lighting system based on the type of plant within the terrarium and a stage of the growth cycle of the plant.

7. The automated terrarium of claim 1, wherein the control unit provides instructions to a user regarding setting up the terrarium and maintaining the plant.

8. The automated terrarium of claim 7, wherein the instructions for maintaining the plant includes at least one of adding water to the terrarium, adding nutrients to the terrarium, pruning the plant, or harvesting the plant.

9. The automated terrarium of claim 1, wherein the irrigation system comprises at least one moisture sensor in communication with the control unit, at least one water tank, and at least one water supply device.

10. The automated terrarium of claim 1, wherein the lighting system comprises at least one light sensor in communication with the control unit and a plurality of lights.

11. The automated terrarium of claim 1, wherein the temperature and air quality control system comprises at least one air inlet, at least one air circulation fan, at least one air filter, at least one air quality sensor, at least one temperature sensor and at least one heat source.

12. The automated terrarium of claim 11, wherein the at least one heat source is a heat sink coupled to the lighting system and the heat sink simultaneously cools the lighting system and warms the terrarium.

13. The automated terrarium of claim 11, wherein the at least one air inlet is controlled to allow ambient air to enter the terrarium to cool the terrarium.

14. The automated terrarium of claim 11, wherein the at least one air inlet is positioned within at least one of the lid or the at least one support pillar.

15. The automated terrarium of claim 11, wherein the at least one air circulation fan constantly circulates air throughout the terrarium.

16. The automated terrarium of claim 1, wherein the at least one trellis ring is repositionable and for at least one of supporting the plant, manipulating the plant, and maximizing growth or harvest of the plant, the at least one support pillar having a plurality of trellis ring attachment points.

17. The automated terrarium of claim 1, further comprising at least one blackout blind adapted to block ambient light from entering the terrarium.

18. The automated terrarium of claim 1, wherein the size of the terrarium is adapted to accommodate a fully grown plant.

19. The automated terrarium of claim 1, wherein the at least one trellis ring is adapted to be installable upside down to hold a mature plant upside down.

20. The automated terrarium of claim 1, wherein the at least one support pillar conceals at least one of electrical wires, tubing, or an antenna.

* * * * *